(12) United States Patent
Kao

(10) Patent No.: US 6,441,887 B1
(45) Date of Patent: Aug. 27, 2002

(54) MEASURING METHOD AND DEVICE

(75) Inventor: Po-Sung Kao, Taichung Hsien (TW)

(73) Assignee: Asia Optical Co., Ltd., Taichung Export Processing Zone (TW)

( * ) Notice: Subject to any disclaimer, the term of this patent is extended or adjusted under 35 U.S.C. 154(b) by 0 days.

(21) Appl. No.: 09/500,227

(22) Filed: Feb. 8, 2000

(51) Int. Cl.[7] ................................................. G01C 3/08
(52) U.S. Cl. ........................ 356/4.01; 356/5.01; 356/5.1
(58) Field of Search .............................. 356/5.01–5.15, 356/4.01, 28, 28.5

(56) References Cited

U.S. PATENT DOCUMENTS 4,346,989 A * 8/1982 Gort et al.
5,221,956 A * 6/1993 Patterson et al. ............. 356/28
5,892,617 A * 4/1999 Wallace ...................... 356/5.01

* cited by examiner

*Primary Examiner*—Stephen C. Buczinski
(74) *Attorney, Agent, or Firm*—Browdy and Neimark

(57) ABSTRACT

Measuring method and device providing a traveling path of light beam. The traveling path includes a front portion between a target and a prism unit, a refraction portion entering the prism unit and extending inside the prism unit and a first and a second rear portions positioned outside the prism unit and corresponding to the front portion. A visible light beam and an invisible light beam at the same time travel along the front portion. The visible light beam comes from the surface of the target while the invisible light beam is a laser beam coming from a laser transmitter. The laser beam travels along the same path as the visible light beam to reach the surface of the target. Therefore, very long parts of the traveling paths of the visible light beam and the invisible light beam coincide with each other and are commonly directed to a specific portion of the target. Accordingly, a better measurement precision can be achieved and the volume of the device can be reduced

20 Claims, 3 Drawing Sheets

MEASURING METHOD AND DEVICE

BACKGROUND OF THE INVENTION

The present invention relates to a range measuring method-and device, more particularly to a technique in which the light beam for measuring the distance of a target extends along the same optical axis as the aiming sight of an observer.

There are two major existing techniques employing light beam with constant wavelength for measuring a distance between a target and an observer. One utilizes multiple invisible light beams with different transmission angles to calculate the distance between the target and the measurer according to the contained angle or the distance between the transmitters. In the other technique, the invisible light beam is transmitted from the transmitter to the target and reflected back to the receiver beside the transmitter. The distance between the target and the measurer is calculated according to the time difference between the transmission and receiving of the light beam.

In practical, the second measuring technique is applied to a laser range finder. Such a laser range finder mainly includes an invisible light beam transmitter, a receiver and a telescope for the measurer to aim at and identify the target and the measured section thereof.

In the general laser range finder, a winding traveling path of the invisible light beam is formed between the transmitter and the receiver, while the telescope has another observation line between the eyes of the observer and the target. (That is, a traveling path of visible light beam.) The visible and invisible light beams travel respectively along independent paths. Therefore, the laser range finder employing such measure has two shortcomings as follows:

1. The volume is larger. The laser transmitter, laser receiver and telescope each has a considerable length and diameter. In addition, several lenses must be respectively disposed thereon. As a result, the combination of the three components will lead to a large volume of the laser range finder.
2. The precision is relatively poor. In use of the laser range finder, an advancing path and a returning path of the invisible light beam are produced between the laser transmitter, laser receiver and the target. Also, an advancing path of the visible light beam is produced between the telescope and the target. The respective paths are spaced from each other by a certain distance and the angles contained thereby vary with the different distances of the targets. Therefore, even though an electronic circuit is used in cooperation with the laser range finder to calculate the distance in accordance with complicated formulas, the measurement result is still not very accurate.

Although the above three independent light beam paths can be combined to a certain extent to improve the aforesaid shortcomings, to the existent knowledge, once any two of the three paths are combined, it will immediately take place that the path of the invisible light beam for measurement or the path of the visible light beam for observation is blocked. Under such circumstance, the function of range finding or observation will be lost.

SUMMARY OF THE INVENTION

It is therefore a primary object of the present invention to provide an measuring method and a device whose the volume is effectively reduced.

It is a further object of the present invention to provide an measuring method and device having better measurement precision.

It is still a further object of the present invention to provide an measuring method and device in which the traveling paths of the light beam for measurement and the light beam for observation extend along the same straight line without affecting the measurement and aiming of a user.

According to the above objects, the measuring method and device of the present invention serves to provide a traveling path of light beam. The traveling path includes a front portion between a target and a prism unit, a refraction portion entering the prism unit and extending inside the prism unit and a first and a second rear portions positioned outside the prism unit and corresponding to the front portion. A visible light beam and an invisible light beam simultaneously travel along the front portion. The visible light beam enters the prism unit and is reflected and then emerges from the prism unit. Thereafter, the visible light beam travels along the first rear portion which is positioned on the same line as the front portion. The invisible light beam enters the prism unit in a predetermined direction and is reflected and then emerges from the prism unit. Thereafter, the invisible light beam travels along the front portion or the second rear portion. The second rear portion contains a predetermined angle respectively with the front portion and the first rear portion. Therefore, very long parts of the traveling paths of the visible light beam and the invisible light beam coincide with each other and are commonly directed to a specific portion of the target. Accordingly, a better measurement precision can be achieved and the volume of the device can be reduced without affecting the measuring function.

The present invention can be best understood through the following description and accompanying drawings wherein:

DETAILED DESCRIPTION OF THE PREFERRED EMBODIMENTS

Figure 1:
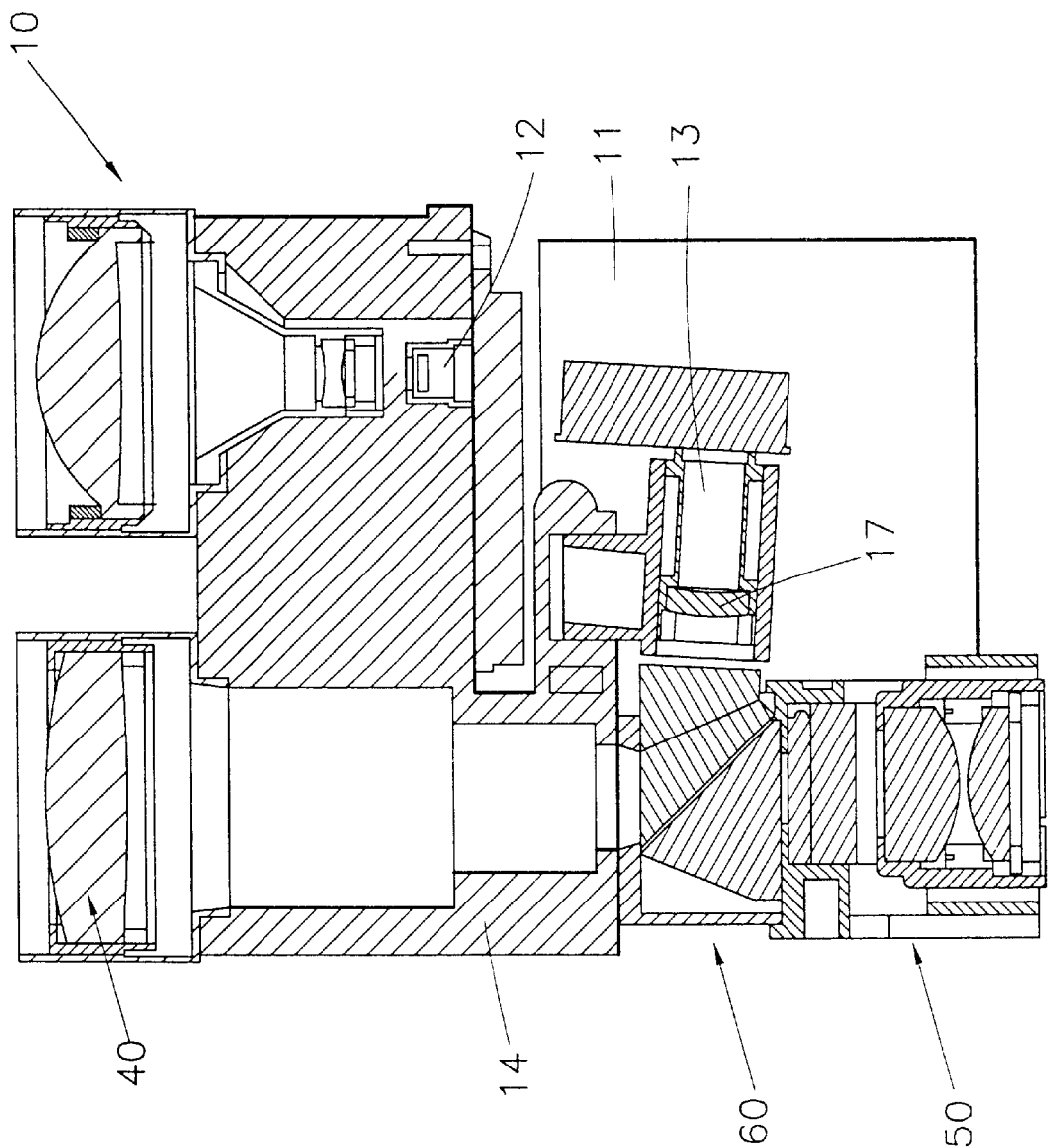
FIG. 1 is a sectional view of the present invention applied to a laser range finder.
Figure 2:
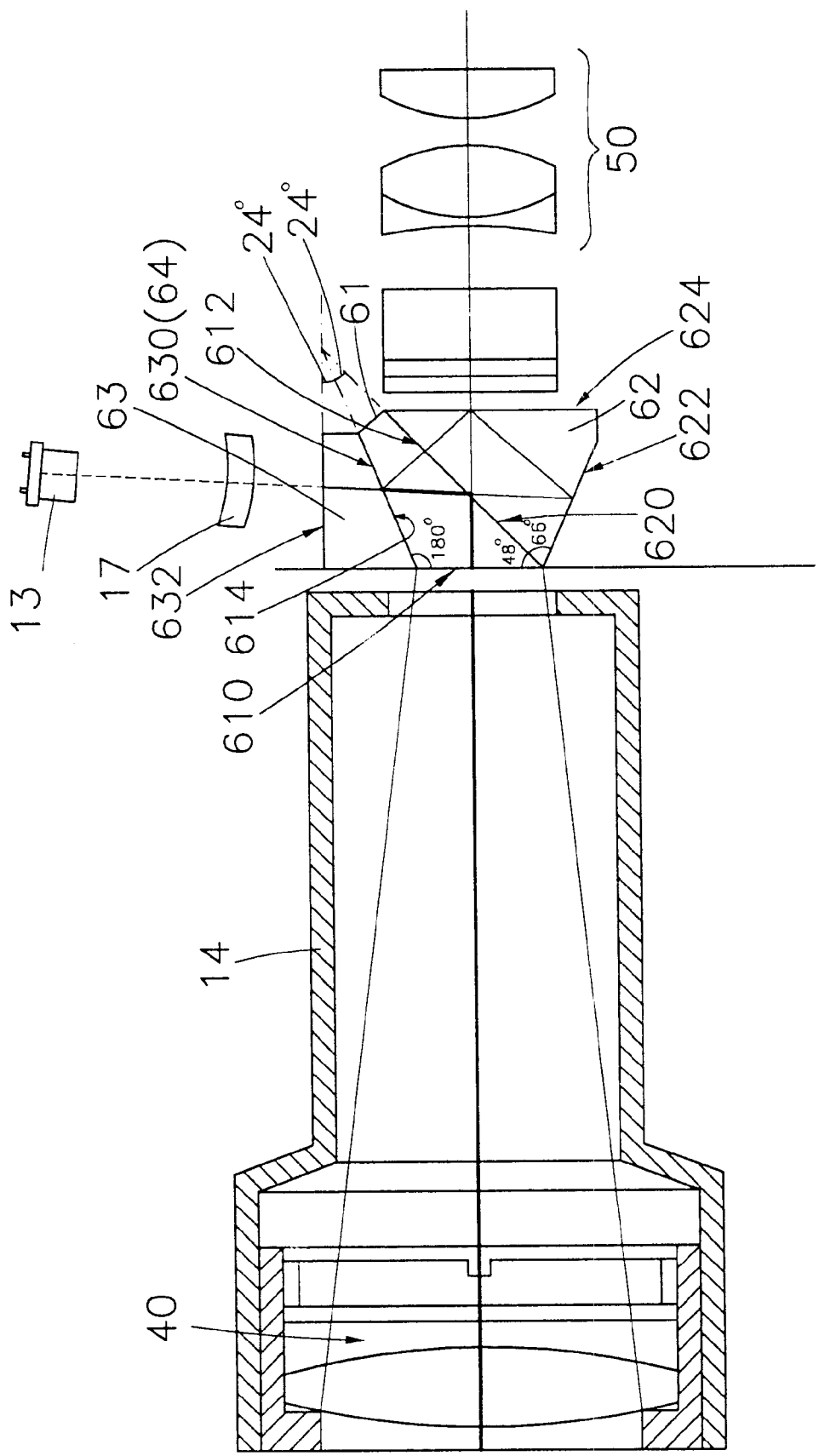
FIG. 2 shows the relative positions of the respective components and the light beams of the present invention.
Figure 3:
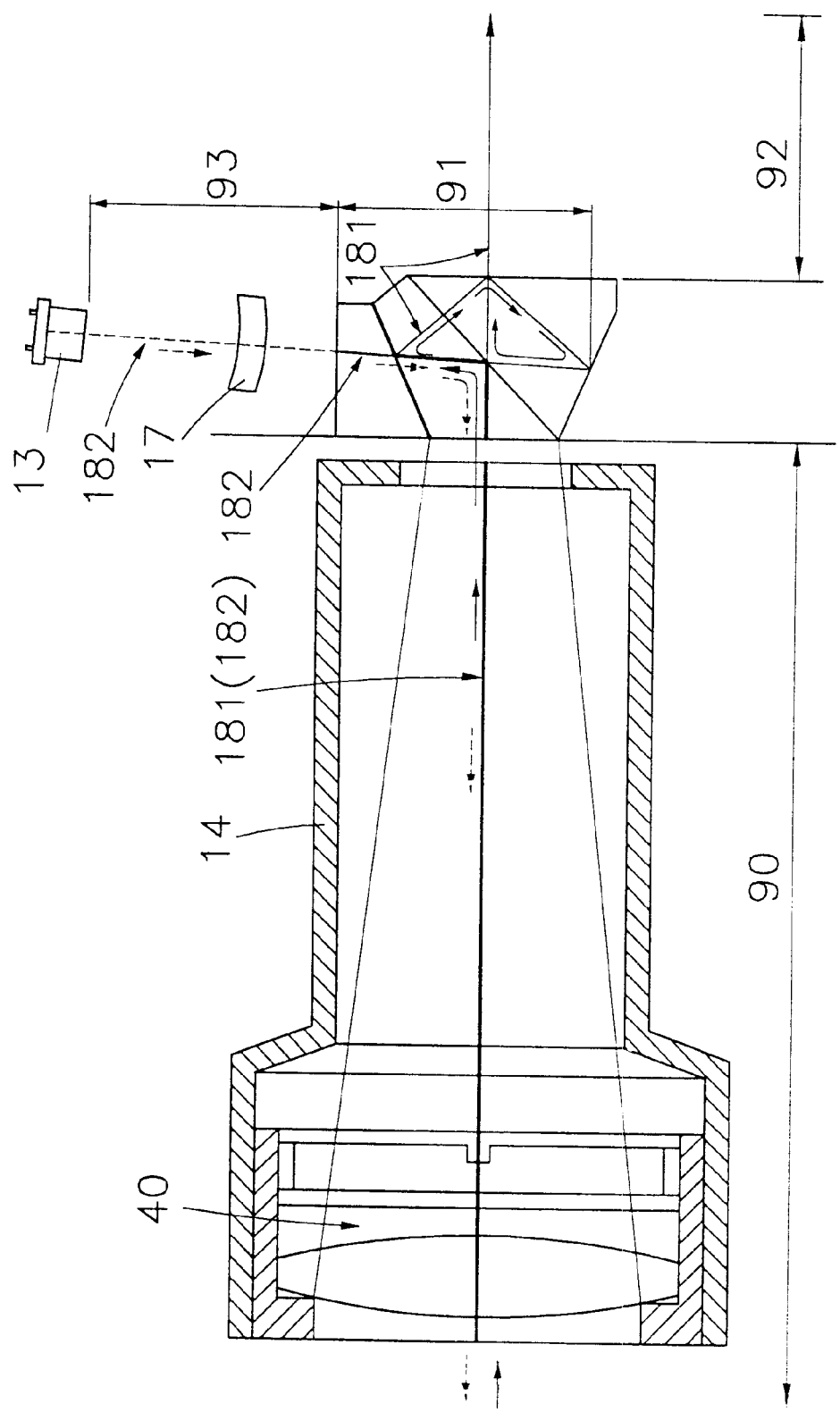
FIG. 3 shows the traveling paths of the light beams of the present invention.

Please refer to FIGS. 1 to 3. The laser range finder 10 of the present invention is composed of a main body 11, a laser receiver 12, a laser transmitter 13 and a telescope 14 disposed in the main body 11. The telescope 14 includes a pair of object piece units 40, an eye piece unit 50 and a prism unit 60 disposed between the object piece units 40 and eye piece unit 50.

The laser transmitter 13 serves to transmit a laser beam (or other usable invisible light beam with suitable wavelength) toward a target. The light beam will return after reaching the surface of the target. The laser receiver 12 serves to receive the returning laser beam and is connected with a preset electronic circuit (not shown) for calculating the distance between the target and the laser range finder 10. With the telescope 14, an user's eyes can receive the visible light (color light observable by human eyes) coming from the target so as to aim at and identify the target and the measured section.

In the embodiment of the present invention as shown in the drawings, the volume of the laser range finder 10 is reduced by such a manner that a light path of mixture of visible light beam 181 and laser beam 182 is formed in front of the prism unit 60. The light path includes a front portion 90 positioned between the target and the prism unit 60, a refraction portion 91 extending along a winding path inside the prism unit 60 and a first and a second rear portions 92, 93 respectively positioned between the prism unit 60 and the eye piece unit 50 and the laser transmitter 13.

The front portion 90 is a light path commonly used by the invisible light beam coming from the laser transmitter 13 and the visible light beam coming from the target. The refraction portion 91 extends inside the prism unit 60 and is divided by the optical coating on a prism face into the first and second rear portions 92, 93 in different directions. The visible light beam 181 travels along the front portion 90 and is projected into the prism unit 60. The light path of the laser beam 182 extends along the second rear portion 93 into the prism unit 60.

The prism unit 60 has a structure similar to the so-called "roofed pechan prism" unit and is composed of a front prism 61, a rear prism 62 and especially an auxiliary prism 63 The front prism 61 has a front face 610 normal to the long axis of the telescope 14, a back face 612 containing an angle of 48 degrees with the front face 610 and upward extending from a lower edge thereof (according to the direction of the drawing) and a top face 614 containing an angle of 108 degrees with the front face 610. The rear prism 62 has a front face 620 tightly attaching to the back face 612 of the front prism, a bottom face 622 containing an angle of 66 degrees with the front face 620 and further downward extending from a lower edge thereof and a back face 624 downward extending from a top end of the top face 620 and normal to the long axis of the telescope 14 and the first rear portion. The auxiliary prism 63 has a front face 630 attaching to the top face 614 of the front prism and a back face 632 normal to the second rear portion. An optical coating 64 is coated between the front face 630 and the top face 614 of the front prism. A laser beam with wavelength over 905 nm can penetrate through the optical coating 64. However, the optical coating 64 will highly reflect the visible light beam with wavelength within 400-700 nm. In addition, the front face 630 and the back face 632 of the auxiliary prism 63 contain an angle of 24 degrees and the back face 612 and the top face 614 of the front prism 61 also contain an angle of 24 degrees.

After a visible light beam 181 coming from the surface of the target reaches the front side of the front prism 61 (as shown by the solid arrow of FIG. 3) and is incident into the front prism 61 in a direction normal to the front face 610 thereof, the visible light beam immediately reaches the back face 612 and is reflected upward to the top face 614. Due to the high reflection of the coating 64, the light beam is further perpendicularly reflected back to the back face 612 and enters the rear prism 62. The traveling path of the visible light beam 181 in the rear prism 62 is such that the traveling path first reaches the back face 624 from the front face 620 and then is reflected to the bottom face 622 and further reflected to the front face 620. Most importantly, at this time, the traveling path of the visible light beam 182 further reflected from the front face 620 to the back face 624 is not only normal to the back face 624, but also extends in the same straight direction as the front portion 90 of the traveling path of the visible light beam 181 inside the telescope 14. After the visible light beam 181 outgoes from the back face 624 of the rear prism, the visible light beam 181 along the first rear portion 92 enters the eye piece unit 50 for a user to observe and aim at the target.

The laser beam 182 transmitted from the laser transmitter 13 is perpendicularly incident into the auxiliary prism 63 from the back face thereof (as shown by phantom arrow of FIG. 3). The laser beam 182 then passes through the optical coating 64 and enters the front prism 61. Then the laser beam is reflected by the back face 612 of the front prism and emerges therefrom in a direction normal to the front face 610 of the front prism. Especially importantly, at this time, the traveling path of the laser beam 182 leaving the prism unit 60 totally coincides with the path of the visible light beam 181 inside the front portion 90 of the telescope 14.

By means of the manner in which the light beams travel, the visible light beam 181 coming from the target and the laser bear 182 transmitted from the laser transmitter 13 can commonly use the object piece units 40 of the telescope 14 and the space between the object piece units 40 and the prism unit 60. Also, by means of the prism unit 60, the traveling paths of the laser beam 182 and the visible light beam 181 can be combined Therefore, the volume of the laser range finder 10 can be greatly reduced. in addition, the traveling paths of the laser beam 182 and the visible light beam 181 overlap at the front portion 90 so that the specific point of the target observed by an observer through the telescope 14 substantively is right the shooting point of the surface of the target from which the laser beam 182 returns to the laser receiver 12. That is, with the laser range finder 10 of the present invention, the point seen by the observer's eyes is right the shot target of the laser beam for measurement. Therefore, the present invention obviously is much more precise than the conventional technique in which the observation point is not the same as the measured point.

As shown in the drawings, an auxiliary lens unit 17 can be additionally disposed between the prism unit 60 and the laser transmitter 13 for adjusting the distance between the laser transmitter 13 and the prism unit 60 and changing the focus for receiving the invisible light beam as well as rectifying the leveling function of the object piece units 40.

In the above embodiment, the invisible and visible light beams coming from the target commonly use the object piece units 40 of the telescope 14 for measurement. In practical application, the positions of the laser transmitter 12 and the laser receiver 13 can be switched. This can also coincide the path of the visible light beam for observation of the target with the path of the invisible light beam returning from the shot point of the surface of the target and thus achieve the above functions of accurate aiming and reduction of volume of the laser range finder.

In the above embodiments, in order to avoid that once the incident angle is different from the emerging angle during repeated the reflection or refraction of the light beam in the prism unit 60, the optical path difference may lead to aberration hard to rectify, the front portion 90 and the first rear portion 92 are made to extend along the same straight line and are respectively normal to the front face 610 of the front prism and the back face 624 of the rear prism. In addition, especially the auxiliary prism 63 has a certain thickness and the back face 632 thereof is normal to the second rear portion 93 so as to reduce the aberration.

The above embodiments are only used to illustrate the present invention, not intended to limit the scope thereof. Many modifications of the above embodiments can be made without departing from the spirit of the present invention.

What is claimed is:

1. A light transmitting device comprising:
   a transmitter;
   a telescope including:

an object lens unit;

an eye lens unit; and a prism unit disposed between the object lens unit and eye lens unit, to provide an optical axis for light beams;

wherein the optical axis includes a front portion defined from a target through the object lens unit to the prism unit, a refraction portion inside the prism unit, a first rear portion and a second rear portion outside the prism unit;

wherein a visible light beam travels along the front portion and enters the prism unit, then reflects inside and emerges out from the prism unit, and thereafter travels along the first rear portion;

wherein an invisible light beam emitted from the transmitter travels along the second rear portion and enters the prism unit, then reflects inside and emerges out from the prism unit, and thereafter travels along the front portion; and wherein the second rear portion contains a predetermined angle respectively with the front portion.

2. The device as claimed in claim 1, wherein the prism unit includes a front prism and a rear prism attaching to each other at a predetermined portion, the visible and invisible light beams traveling in different directions being reflected in the front prism by predetermined angle and emerging from the front prism in different directions, only the visible light beam emerging from the front prism being reflected in the rear prism.

3. The device as claimed in claim 1, wherein a predetermined portion of the prism unit is coated with an optical coating, the invisible light beam being able to penetrate through the optical coating, while the visible light beam being highly reflected by the optical coating.

4. The device as claimed in claim 3, wherein the prism unit further includes an auxiliary prism, a front face of the auxiliary prism being attached to the optical coating.

5. The device as claimed in claim 4, wherein the auxiliary prism has a planar back face opposite to the optical coating, the back face being normal to the extending direction of the second rear portion.

6. The device as claimed in claim 1, wherein the invisible light beam is a laser beam traveling between the laser transmitter, the target and the laser receiver.

7. The device as claimed in claim 1, wherein the invisible light beam has a wavelength longer than 700 nm.

8. The device as claimed in claim 6, wherein the second rear portion is positioned between the laser receiver and the prism unit.

9. The device as claimed in claim 6, wherein the second rear portion is positioned between the laser transmitter and the prism unit.

10. A light receiving device comprising:

a receiver;

a telescope including:
  an object lens unit;
  an eye lens unit; and
  a prism unit disposed between the object lens unit and the eye lens unit to provide an optical axis for light beams;

wherein the optical axis includes a front portion defined from a target through the object lens unit to the prism unit, a refraction portion inside the prism unit, a first rear portion and a second rear portion outside the prism unit;

wherein a visible light beam travels along the front portion and enters the prism unit, then reflects inside and emerges out from the prism unit, and thereafter travels along the first rear portion;

wherein an invisible light travels along the front portion and enters the prism unit then reflects inside and emerges out from the prism unit, and thereafter travels along the second rear portion to the receiver; and wherein the second rear portion containing a predetermined angle respectively with the front portion.

11. The device as claimed in claim 10 wherein the prism unit includes a front prism and a rear prism attaching to each other at a predetermined portion, the visible and invisible light beams traveling in the same direction being incident into and the front prism and reflected therein by predetermined angle and emerging from the front prism in different directions, only the visible light beam emerging from the front prism being reflected in the rear prism.

12. The device as claimed in claim 2, wherein the prism unit further includes an optical coating, the invisible light beam being able to penetrate through the optical coating, while the visible light beam being highly reflected by the optical coating, the prism unit further including an auxiliary prism having a front face attaching to the optical coating, the front prism having a front face corresponding to the front portion, a top face on which the optical coating is coated and a back face adjacent to the prism, the top face and back face of the front prism containing angle equal to the angle contained by the front face and back face of the auxiliary prism.

13. The device as claimed in claim 2, wherein the rear prism has a front face adjacent to the back face of the front prism and a planar back face normal to the first rear portion.

14. The device as claimed in claim 10 wherein a predetermined portion of the prism unit is coated with an optical coating, the invisible light beam being able to penetrate through the optical coating, while the visible light beam being highly reflected by the optical coating.

15. The device as claimed in claim 14, wherein the prism unit further includes an auxiliary prism, a front face of the auxiliary prism being attached to the optical coating.

16. The device as claimed in claim 15, wherein the auxiliary prism has a planar back face opposite to the optical coating, the back face being normal to the extending direction of the second rear portion.

17. The device as claimed in claim 10, wherein the invisible light beam is a laser beam traveling between the laser transmitter, the target and the laser receiver.

18. The device as claimed in claim 10, wherein the invisible light beam has a wavelength longer than 700 nm.

19. The device as claimed in claim 17, wherein the second rear portion is positioned between the laser receiver and the prism unit.

20. The device as claimed in claim 17, wherein the second rear portion is positioned between the laser transmitter and the prism unit.

* * * * *